Oct. 29, 1935. H. HERMANI 2,019,223
METHOD AND APPARATUS FOR ASSEMBLING RECEPTACLE PARTS
Filed Aug. 24, 1932 11 Sheets-Sheet 2

Inventor
HENRY HERMANI
By J. Granville Meyers
Attorney

Oct. 29, 1935. H. HERMANI 2,019,223
METHOD AND APPARATUS FOR ASSEMBLING RECEPTACLE PARTS
Filed Aug. 24, 1932 11 Sheets-Sheet 3

Fig. 4.

Inventor
HENRY HERMANI
By J. Granville Meyers
Attorney

Oct. 29, 1935.                H. HERMANI                2,019,223
           METHOD AND APPARATUS FOR ASSEMBLING RECEPTACLE PARTS
                    Filed Aug. 24, 1932        11 Sheets-Sheet 5

Inventor
HENRY HERMANI
By J. Granville Meyers
                Attorney

Oct. 29, 1935. H. HERMANI 2,019,223
METHOD AND APPARATUS FOR ASSEMBLING RECEPTACLE PARTS
Filed Aug. 24, 1932 11 Sheets-Sheet 9

Inventor
HENRY HERMANI

By J. Granville Meyers
Attorney

Oct. 29, 1935.  H. HERMANI  2,019,223
METHOD AND APPARATUS FOR ASSEMBLING RECEPTACLE PARTS
Filed Aug. 24, 1932  11 Sheets-Sheet 10

Inventor
HENRY HERMANI
By J. Granville Meyers
Attorney

Oct. 29, 1935.  H. HERMANI  2,019,223
METHOD AND APPARATUS FOR ASSEMBLING RECEPTACLE PARTS
Filed Aug. 24, 1932   11 Sheets-Sheet 11

Inventor
HENRY HERMANI
By J. Granville Meyers
Attorney

Patented Oct. 29, 1935

2,019,223

UNITED STATES PATENT OFFICE 2,019,223

METHOD AND APPARATUS FOR ASSEMBLING RECEPTACLE PARTS

Henry Hermani, Baltimore, Md., assignor to The Tin Decorating Company of Baltimore, Baltimore, Md., a corporation of New Jersey Application August 24, 1932, Serial No. 630,310

24 Claims. (Cl. 113—7)

My present invention relates to a method of and apparatus for assembling two-part telescoping receptacles or tins, and in the present application I have illustrated the invention in connection with, or as applied to, the manufacture of telescopingly collapsible boxes or cans of the type shown in my prior patent, No. 1,770,920, dated July 22, 1930, wherein the collapsible boxes or cans are made up of two tubular parts of generally oblong shape in cross-section, one of which has a bottom and the other of which has a hinged closure.

While I have elected to illustrate and describe the invention as applied to telescoping boxes or cans of the type and shape stated, I wish to be understood as not limiting the same to boxes of this particular type and shape, since it may be employed in assembling containers of various kinds as will hereinafter become obvious.

Prior to the present invention the two parts of boxes or cans were assembled by hand after the parts had been made on other machines. This hand assembling method was not only slow, tedious, and costly, but because of the fact that the sharp raw edges of the two companion box parts had to be alined and telescopingly connected with the sharp edges confronting each other while held in the hands of the operator, it frequently happened that the fingers of the operator would become cut or bruised. This not only slowed up the production and materially added to the cost of the assembling operation, but introduced other and more serious complications.

The method and machine of the present invention not only simplifies and reduces the cost of the assembling operation, because of the speed with which the parts may be assembled, but the other serious complications above referred to are entirely eliminated.

According to the general plan of operation of the machine the companion box parts to be assembled, and which are of tubular formation, are automatically delivered onto and advanced upon a suitable support in endwise relationship, that is with the open ends confronting each other. At a predetermined time one of the parts is canted or arranged at an angle to the other part at a definite point in the path of advancing movement of the two parts just before or just as they are brought into telescoping relation, one with the other, by relative endwise movement. During this latter movement the canted or angularly disposed part is straightened or alined in the other part and then the assembled cans are preferably automatically discharged from the machine.

Briefly and generally stated, the invention, as to method, consists in supporting the companion box parts to be assembled in endwise relation, that is, with their open ends confronting each other and with one of the parts arranged at an angle to the other, then advancing and guiding the parts toward each other to cause one part to partially enter the other, and in simultaneously straightening the angularly disposed part to aline it with the other part during the first assembling operation.

Briefly and generally stated, the invention, as to the machine, comprises a support for the box parts to be assembled, means for advancing companion box parts in endwise relation along the said support, with one of the parts disposed at an angle to the other, and means for moving the angularly disposed part into telescoping relation with the other part and simultaneously straightening and alining the parts during the assembling operation.

The invention further includes the construction and arrangement of parts and the combinations of cooperating elements herein shown and described in connection with the objects and advantages, and then more definitely pointed out in the appended claims.

In order to enable others skilled in the art to build and use the machine and to practice the method, I will now proceed to describe the same in detail, reference being had for this purpose to the accompanying drawings, wherein.

Figure 1:
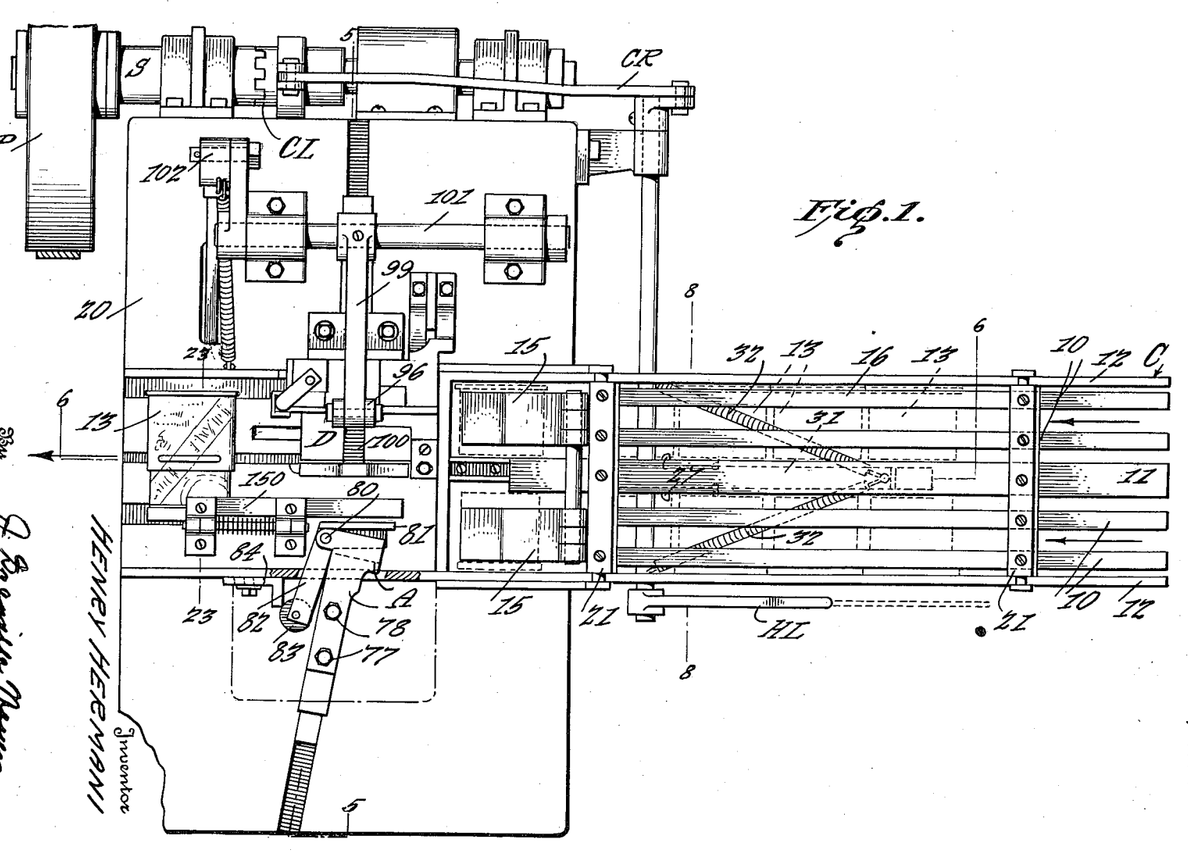
Fig. 1 is a top plan view of a machine embodying my invention.

The delivery mechanism, that is, the means by which the parts to be assembled are conveyed or delivered to what will hereinafter be referred to and described as the feeding mechanism is best shown in Figs. 1, 6, 7, 8, and 25-29. In Fig. 1, the chute down which the can parts are delivered is designated generally by the reference character C, and the chute includes inclined spaced bottom bars or strips 10, there being two of the bars 10 between a central rod or bar 11 and side plates 12. The thickness of the bar 11 and plates 12 is shown as being greater than that of the bars 10, so that the ends of the parts of the cans resting on the bars 10 may contact with the sides of the bar 11 and side plates 12 to give the parts guided movement down the chute on bars 10. The can parts are fed on to the chute in pairs with one part on each side of the bar 11 and having their open ends which are to telescopically engage confronting each other. The can parts, as shown in dotted lines in Fig. 1 and indicated by the numeral 13, are thus arranged on each side of the bar 11 and on top of the bars 10 in a continuous line and in contact with each other, it being obvious that they will gravitate down the chute in columns and in the relative positions mentioned.

Figure 6:
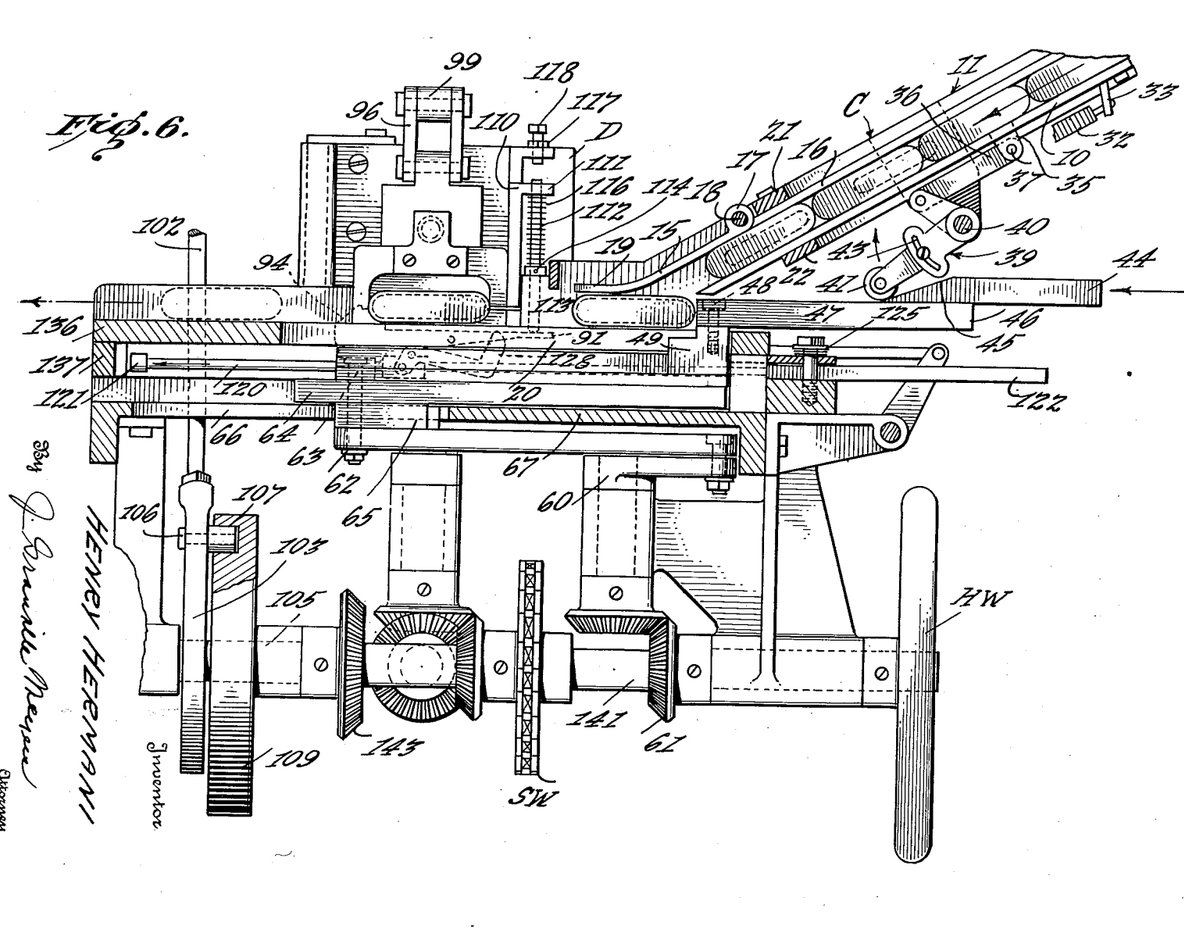
Fig. 6 is a view taken on the line 6—6 of Fig. 1.

As hereinbefore stated, one part of the can has a hinged cover and although the person who feeds the parts on to the chute should see that the hinged covers are closed, it may happen that the hinged covers may not be closed tightly and during the gravitation or movement of the cans down the chute some of the covers may tend to come open. To assure the delivery of the can parts to the feeding mechanism with the covers closed and to prevent jamming, I provide, (Figs. 8 and 9) in the plate 12 which is disposed at the side of the chute delivering the hinged cover parts, a cam groove 14. Obviously, if a can part comes down the chute with the cover partly open or tending to open the cover will swing out into the cam groove 14 and eventually the cover will be closed when the can part reaches the point where the cam groove ends, which, preferably, is adjacent the delivery end of the chute. As shown in Fig. 6, there are hinged plates 15, one on each side of the bar 11 and each having a portion in alinement with bars 16 which may be arranged parallel to the bars 10 and spaced thereabove a distance equal substantially to the thickness of the cans which are delivered down the chute between the bars 10 and the bars 16. The plates 15 terminate at one end in bosses 17 which receive pintles 18 to hingedly secure the plates 15 in position. The other ends 19 of the plates 15 are bent into a plane substantially parallel with the supports 20 onto which the cans are delivered just in advance of the feeding mechanism hereinafter described. The bars 16 are connected at their ends to cross pieces 21 which are mounted or supported on the plates 12, and the bars 10 are supported on cross pieces 22 beneath the pieces 21 and also connected to the plates 12 in any suitable manner.

Figures 7, 8, 9:
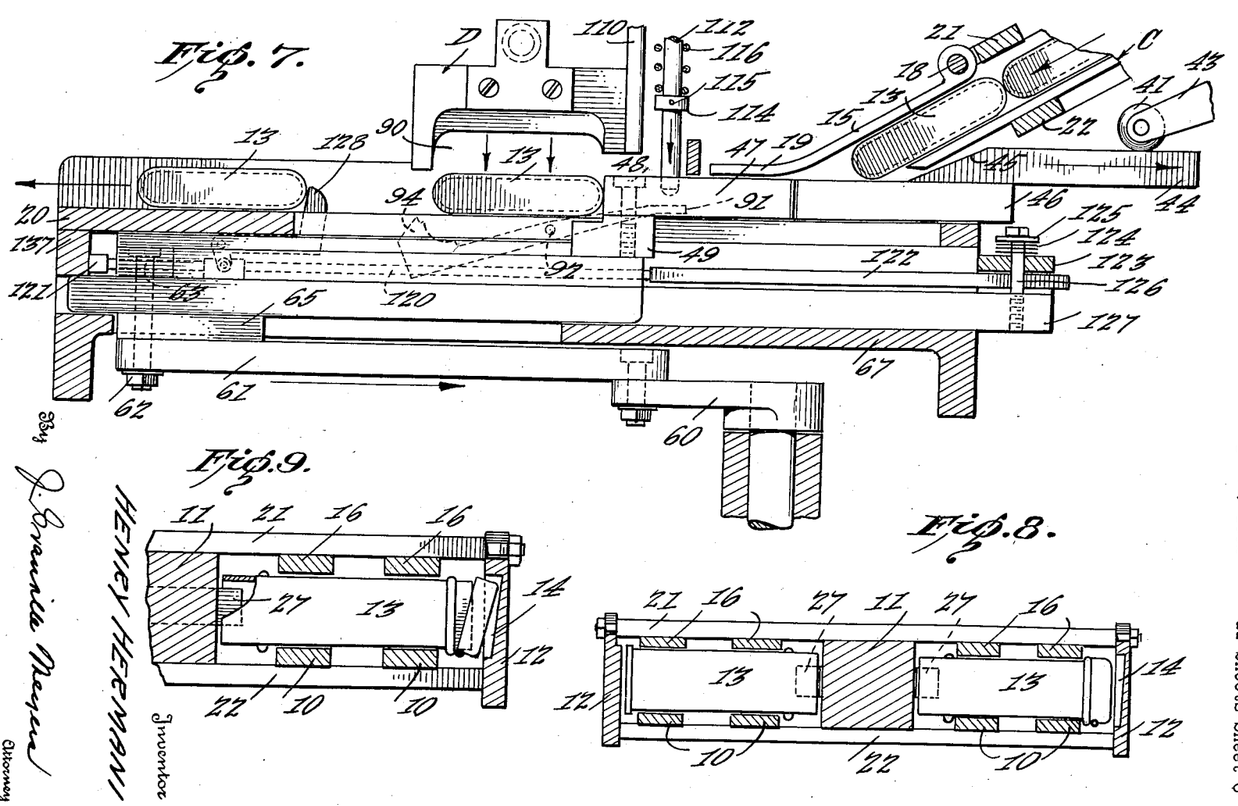
Fig. 7 is an enlarged detailed fragmentary view showing the delivery and discharging means moved from the positions shown in Fig. 6.
Fig. 8 is a view taken on the line 8—8 of Fig. 1.
Fig. 9 is an enlarged fragmentary sectional view showing a detail of the delivery chute with means for closing hinged covers on the can.

From the foregoing it should be obvious that can parts fed on to the chute C will gravitate downwardly in pairs with their open ends alined and confronting on opposite sides of the bar 11, and in order to effect delivery of the pairs one at a time at predetermined intervals, I provide the mechanism shown in detail in Figs. 25-29 and shown applied to the chute in Figs. 1, 8, and 9.

Figure 25:
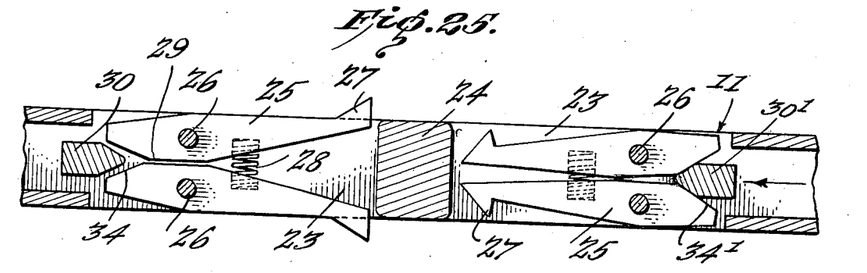
Fig. 25 is a detail fragmentary view partly in section of a portion of the delivery chute showing the can stops or feed dogs.
Figure 26:
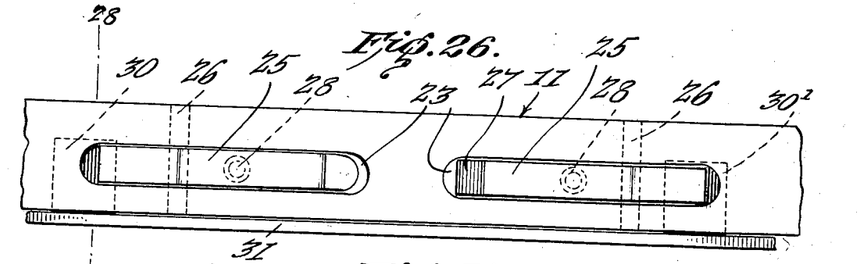
Fig. 26 is a top elevation of the mechanism shown in Fig. 25.
Figure 27:
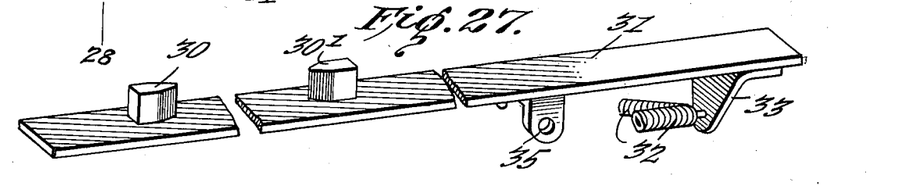
Fig. 27 is a foreshortened perspective view of the actuating mechanism for the feed dog shown in Fig. 25.
Figure 28:
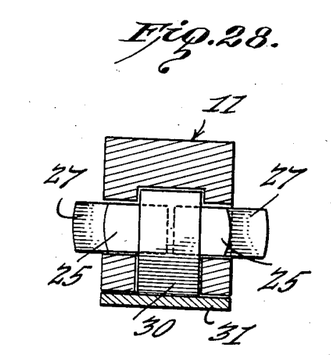
Fig. 28 is a view taken on the line 28—28 of Fig. 26.
Figure 29:
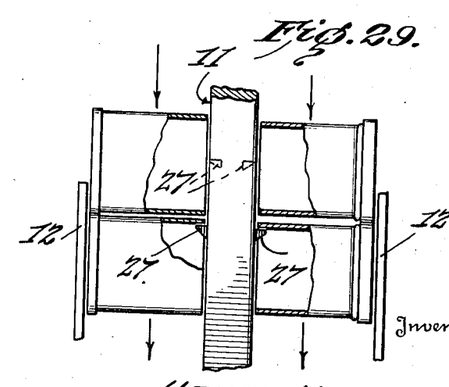
Fig. 29 is a fragmentary view in elevation of a portion of the delivery chute adjacent the feed dogs with the cans partly broken away to show the relative positions of the feed dogs.

Referring to Figs. 25 and 26, it will be noted that the bar 11 has provided therein chambers or recesses 23 separated by a cross piece or block 24 adjacent the delivery or lower end of the chute. The open sides of these chambers 23 confront the open ends of the can parts. Within each of the chambers is mounted a pair of feed dogs 25 pivoted on pins 26 and having hooked ends 27. A coil spring 28 has its ends seated in alined recesses on the inner faces of the arms of the dogs 25 and normally tends to urge them apart by turning the dogs on the pivot 26 to dispose the hooks 27 beyond the sides of the bar 11 and into the open ends of the can parts. The amount of opening movement of the arms of the dogs 25 is determined by the contact of the confronting faces 29. In order to retract or draw the hooked ends 27 of the dogs within the chamber 23 and out of the open ends of the can parts to permit the can parts to gravitate onto the supports 20, I provide wedge blocks 30 and 30' on a plate 31 (Fig. 27). The plate 31 is mounted beneath the bar 11 for limited reciprocating movement. Springs 32 are secured to the upper end of the plate 31, which may be provided with a depending bracket or a lug 33 for attachment of the springs, and at their other ends the springs are attached to any fixed part adjacent the lower end of the chute such as the plate 12, (see Fig. 1) so as to normally tend to pull the plate 31 downwardly and bring the upper wedge member 30' into engagement with the beveled faces 34 on the upper pair of dogs 25 and overcoming the force of the spring 28 so as to turn the dogs on the pintles 26 sufficiently to bring the faces 29 into contact and to retract the hooked ends 27. This position of the plate places the lower wedge member 30 out of engagement with the beveled faces 34 on the other pair of dogs and permits the springs 28 to force the lower dogs apart sufficiently to position the hooked ends outwardly from the chamber 23 and disposed in the path of movement of the approaching cans. Initially, the first pair of can parts are positioned as shown in Fig. 29 with the lower dogs engaging the upper sides of the can parts on the interior of the can to hold them at the lower end of the chute just above the feeding table 20 and at which time the next pair of can parts are resting against the outer surface of the upper sides of the lower can parts with the hooked ends on the other pair of dogs retracted and positioned intermediate the sides of the uppermost pair of can parts as shown in dotted lines, the upper dogs of course at this time being retracted. In this position the sustained lowermost pair of can parts support the entire columns in the chute.

In order to effect delivery of the lowermost pair of can parts on to the feed table 20 successively, the plate 31 must be reciprocated so as to alternately bring the wedge members 30 and 30' into contact with the beveled faces 34 and 34' of the feed dogs 25. To this end I may provide a depending lug 35 on the plate 31 and pivotally connect thereto a link 36 (Fig. 6), the link and lug each having openings adapted to register and receive the pin 37 to provide the pivotal connection. The other end of the link 36 is pivotally connected at 38 to one arm of a crank lever 39 which is pivotally supported at 40 on a bracket which may be secured to one of the fixed parts of the chute. The other arm of the crank lever 39 is adjustably connected to a member 40 rotatably supporting at its outer end a wheel or roller 41. The adjustable connection between the member 40 and crank lever is made by means of the screw and slot indicated generally by the reference character 43, it being understood that the adjustment is for the purposes of varying the angular position of the crank lever 39, but that the member 40 and crank lever 39 are rigidly connected for movement together. The movement of the crank lever and member 40 is effected by movements of the mechanism which feeds the delivered pairs of can parts to the assembling mechanism, such feeding mechanism being presently described and including an actuating member 44 and having a beveled face 45 for contact with the roller 41. As will be hereinafter seen, the member 44 has a reciprocating motion from left to right of the position shown in Fig. 6 so that as it moves to the left with the feeding mechanism the roller 41 is raised along the beveled face 45 turning the crank lever 39 and pushing the plate 31 upwardly through the medium of the link 36 and connection 37 whereby the lower wedge member 30 on the plate 31 contacts with the beveled faces 34' on the lower feed dogs and simultaneously the wedge member 30' is moved from engagement with the beveled faces 34 on the upper feed dogs.

Before proceeding with the detailed description of the feeding mechanism above referred to and which is best shown in Figs. 6, 7, 10, 11, 15, and 22 I would also explain that the two can parts which are delivered upon retraction of the lower feed dogs slide on to the supports 20 in spaced alined relation with their open ends confronting each other. The next step is to move these can parts in spaced relation along the table 20 into alinement with the mechanism which will force the open end of one can part into the open end of the other can part. I have hereinbefore explained generally that the assembling of the two parts includes the feature of canting one of the parts relative to the other. Preferably I accomplish this canting of the one part while feeding the parts to the assembling apparatus, that is, while moving them across the table 20.

Figure 10:
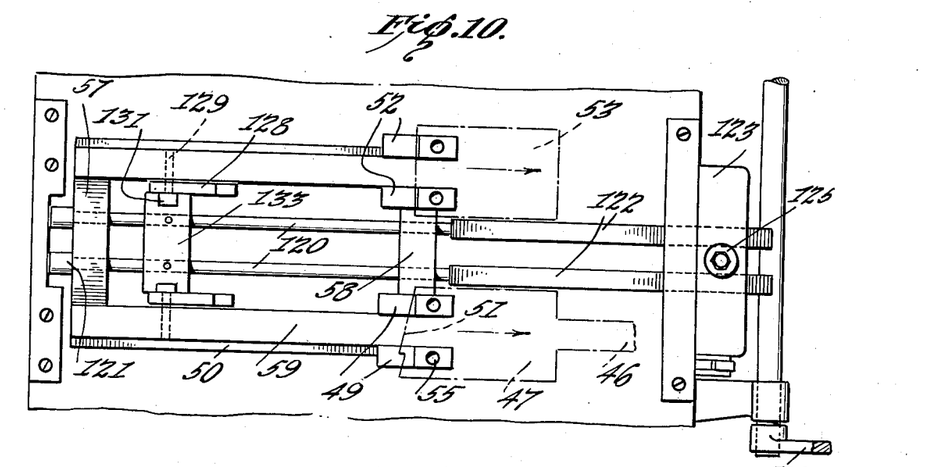
Fig. 10 is an enlarged plan view of a portion of the feeding and discharging apparatus.
Figure 11:
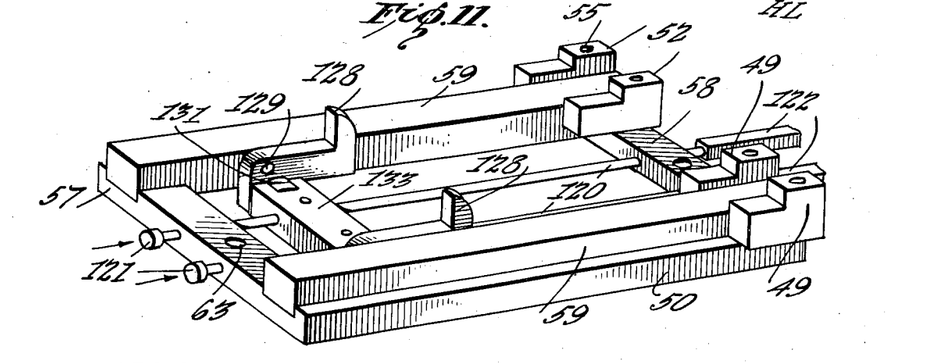
Fig. 11 is a perspective view of the discharging apparatus shown in Fig. 10.
Figures 12, 13, 14:
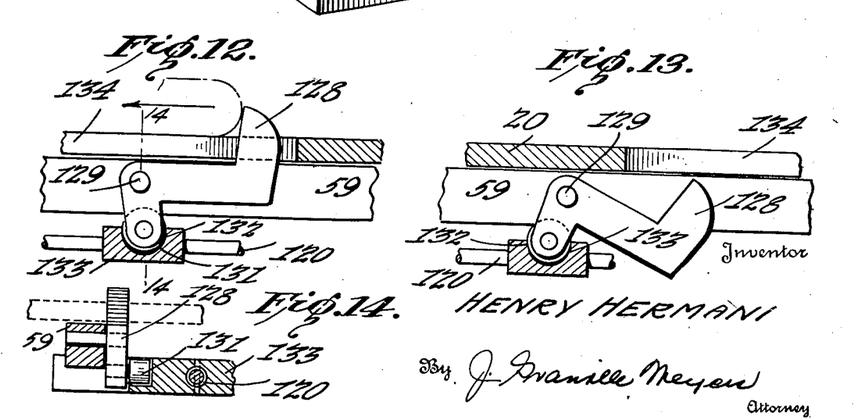
Figs. 12 and 13 are detail views of parts of the discharging apparatus.
Fig. 14 is a view taken on the line 14—14 of Fig. 12.
Figure 22:
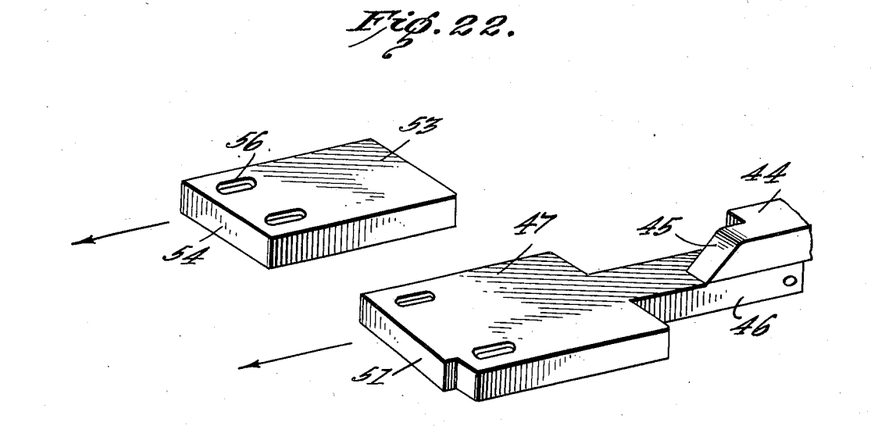
Fig. 22 is a detail perspective view of elements of the can feeding mechanism.
Figure 23:
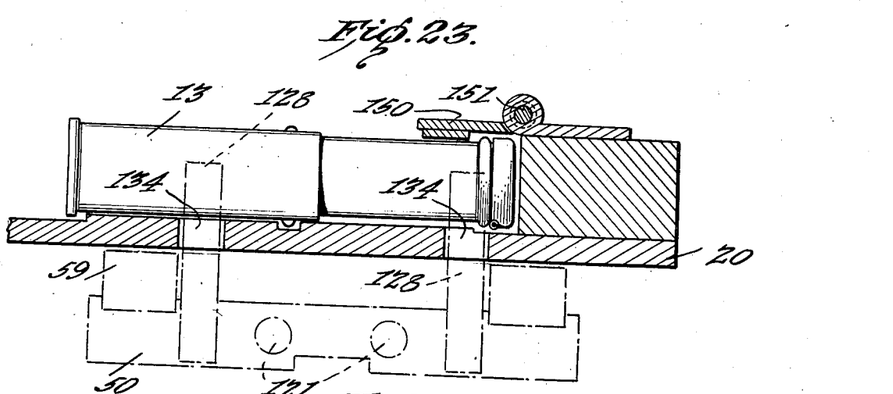
Fig. 23 is a view taken on the line 23—23 of Fig. 1.
Figure 24:
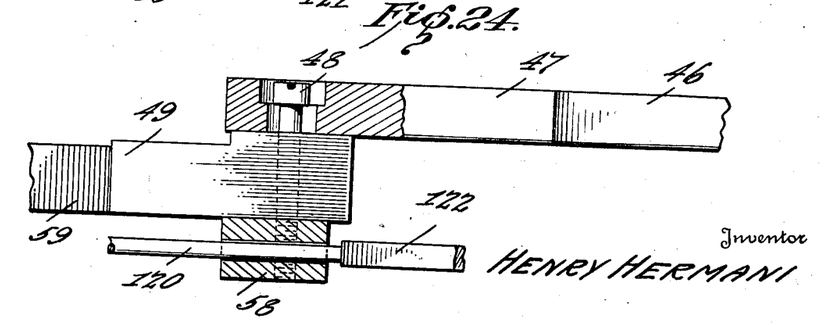
Fig. 24 is a fragmentary view partly in section showing portions of a feeder, and the sliding frame on which the feeder is mounted.

Referring to Figs. 6 and 7, it will be noted that the member 44 which trips the crank lever 39 is rigidly secured to the top rear end of an extension 46 on the feeder 47, which feeder engages the side edge of one of the can parts, and as shown in the drawings the said part being that having the hinged cover and delivered down the left side of the chute. This feeder 47 is secured by bolts 48 to spaced blocks 49, shown in detail in Fig. 11, and carried by a sliding frame 50 hereinafter described in detail. The front face or end of the pusher 47 which contacts the side of the said can part, as shown in Figs. 10 and 22, is inclined or beveled as indicated by the numeral 51 so that when the feeder contacts the can part and pushes it across the support 20 to the assembling mechanism, it will cant the said can part. Also as shown in Fig. 11, the frame 50 carries blocks 52 identical with the blocks 49 and adapted to receive the feeder 53 shown in Figs. 10 and 22, which feeder has a straight face 54 to contact a side of the other or bottom can part 30 which has been delivered down the right side of the chute. A clear understanding of the relative positions of the two can parts when being moved by the feeders to the assembling apparatus may be had by reference to Fig. 15, where the feeder 53 is shown in contact with one can part and the feeder 47 is shown in contact with the other can part which latter part has been canted relative to the first can part by the beveled face 51 of the feeder 47. The blocks 52 are provided with screw threaded openings 55 to receive bolts similar to the bolts 48 which extend through the slots 56 in the feeder 53 to secure the feeder to the blocks 52. The blocks 49 and 52 are fixedly secured to the cross bars 57 and 58 of the frame 50 on opposite sides of the longitudinal bars 59 on the frame 50 for movement therewith. The supports 20 on which the cans ride are arranged above the bars 59 as shown in Fig. 6, and have their upper faces substantially in alinement with the tops of the blocks 52 and 49 and the lower surfaces of the feeders.

The feeders and the frame 50 are moved by the apparatus disclosed most clearly in Figs. 6 and 7. In Fig. 6 the feeders and sliding block are shown in retracted position behind the delivered can parts and in Fig. 7 the block and feeders are shown advanced with the can parts positioned for assembly by the apparatus presently described. The actuating mechanism for the sliding block comprises a crank indicated generally by the numeral 60 in Figs. 6 and 7, driven by the gears indicated generally at 61 in Fig. 6, the gears being driven by power apparatus, forming no part of the invention but hereinafter described. The crank 60 is connected to a link 61 which in turn is connected to the sliding frame 50 by bolt 62 which extends through the opening 63 in the sliding frame and through the guide 64 on which the frame rests. The bolt also extends through a block 65 arranged between the guide 64 and link 61 and which is adapted to move in the slot 66 in the frame 67 of the machine. Obviously, as the crank turns the lever 61 moves the frame 50 from left to right of the position shown in Figs. 6 and 7 carrying therewith the feeders and the member 44 which moves the crank lever 39 to actuate the dogs in the delivery chute. Hence, the delivery and feeding mechanisms are operated by a common source of power and are synchronized in movement as hereinafter explained. I further utilize the movement of the sliding frame 50 to actuate the discharge mechanism for removing the assembled cans from the machine after the assembling operation has been completed by the apparatus now to be described.

Figure 15:
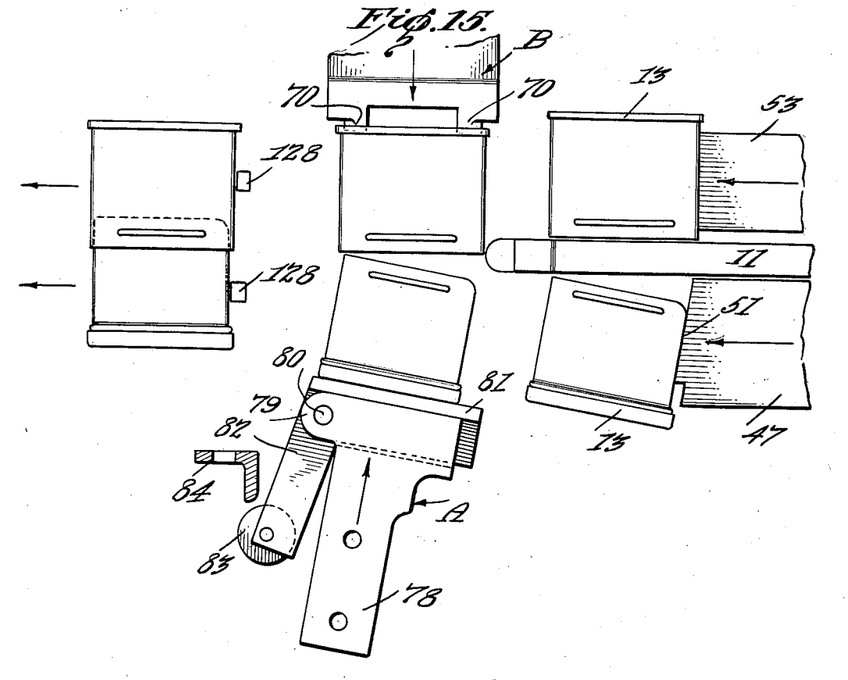
Fig. 15 is a plan view illustrating the manner of feeding, assembling and discharging the can parts.
Figures 16, 17:
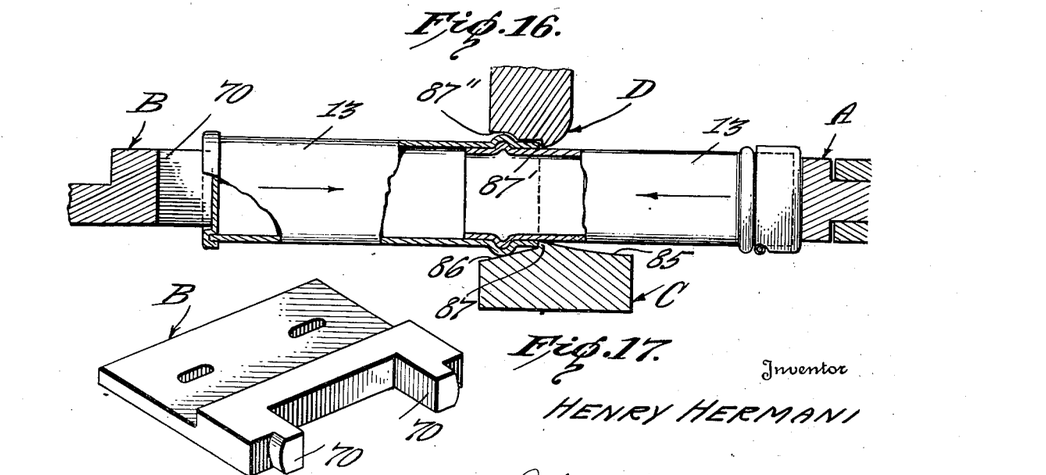
Fig. 16 is an enlarged fragmentary view partly in section showing the can parts in assembled relation with the holding means and the means for pushing the cans together.
Fig. 17 is a perspective view of one of the pushing elements shown in Fig. 16.

The assembling apparatus includes elements for guiding the can parts toward each other; elements for pushing the can parts together to effect the entry of one can part into the other; and elements for clamping the cans while the parts are being pushed together, such elements being shown best in Figs. 1, 2, 6, 15-20. For the present I will refer to the members which push the can parts together into assembled relations generally by the reference characters A and B, and the members which guide the parts together by the reference character C. The members A and B operate transversely of the path of movement of the feeders, and the member C has a fixed position, so that the parts move relative thereto into assembled relation. This is shown generally in Fig. 16 where the pusher A is in engagement with the hinged cover of one can part, which is the part having its open end disposed within the open end of the other part, said latter part being engaged by the pusher B. It will be understood that the second part of the can, which is the bottom, is usually provided with a flange around its margin and a recess in its bottom. As shown in Fig. 17, I provide the pusher B with two forwardly projecting lugs 70 having curved side faces according to the contour of the sides of the can. The lugs 70 are further spaced apart a distance substantially equal to the widest dimension of the recess in the bottom of the can and are of a thickness to nicely fit within the recess substantially in engagement with the inner walls of the recess as shown in Fig. 16. Thus, when the pusher B engages the can part which has been positioned in alinement with its path of movement by the feeder 53, the lugs 70 fit within the recess in the bottom of the can and prevent the part from sliding transversely.

Figures 2, 3:
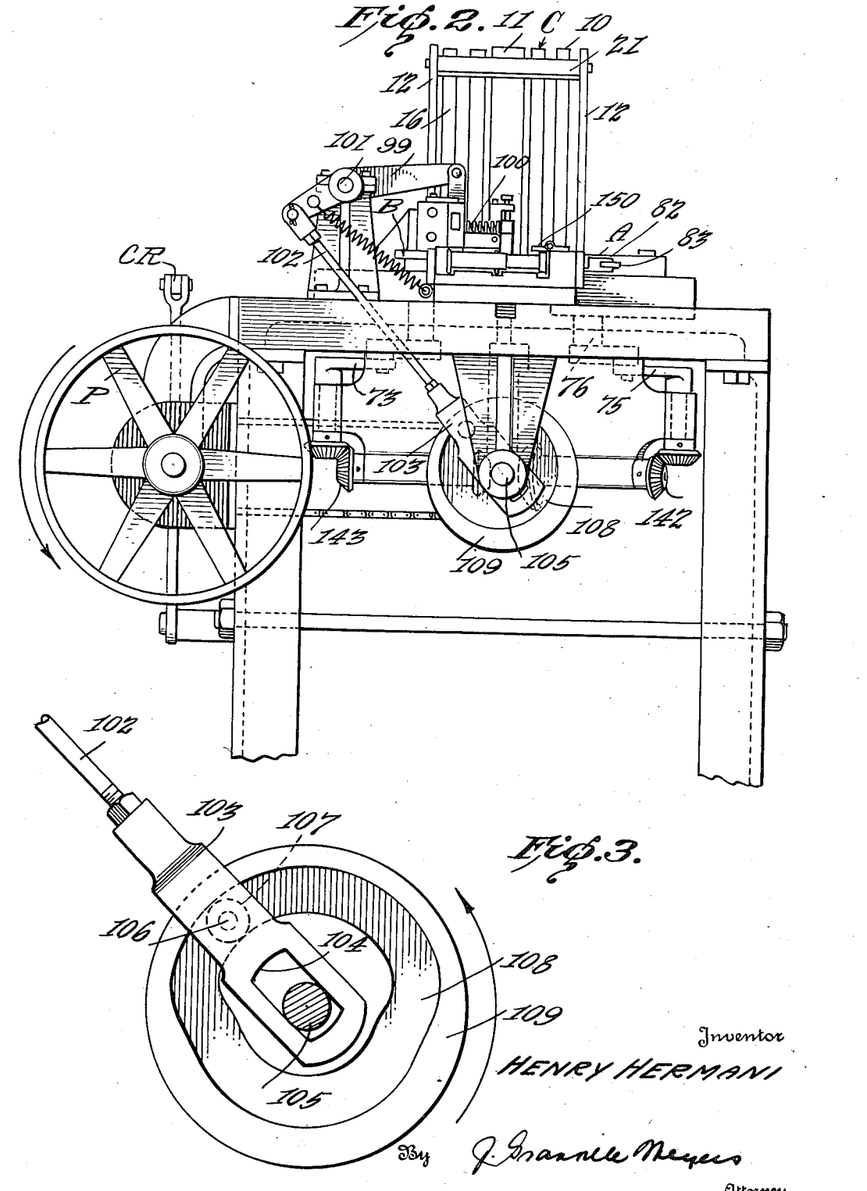
Fig. 2 is an end elevation of the machine.
Fig. 3 is a fragmentary enlarged detail view of actuating mechanism for the parts which hold the cans during the final assembling operation.
Figure 4:
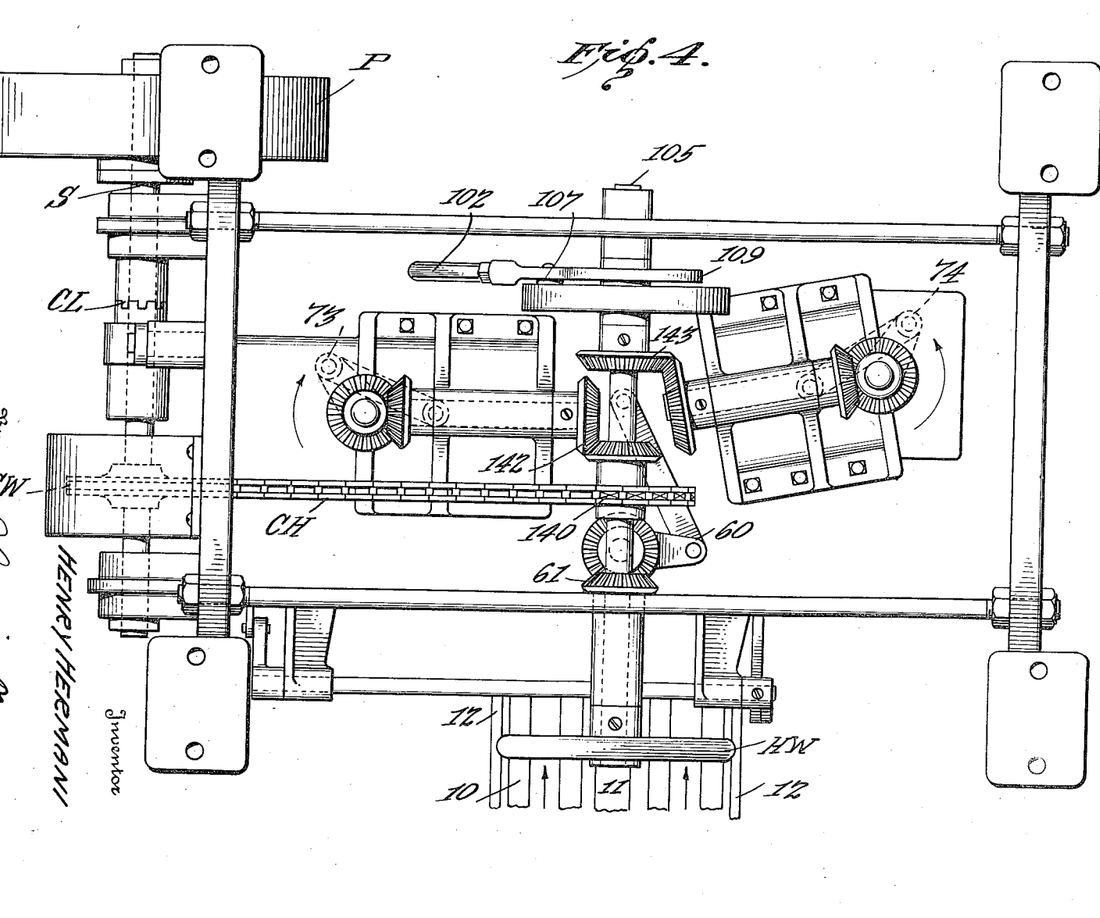
Fig. 4 is a bottom plan view of the machine.
Figure 5:
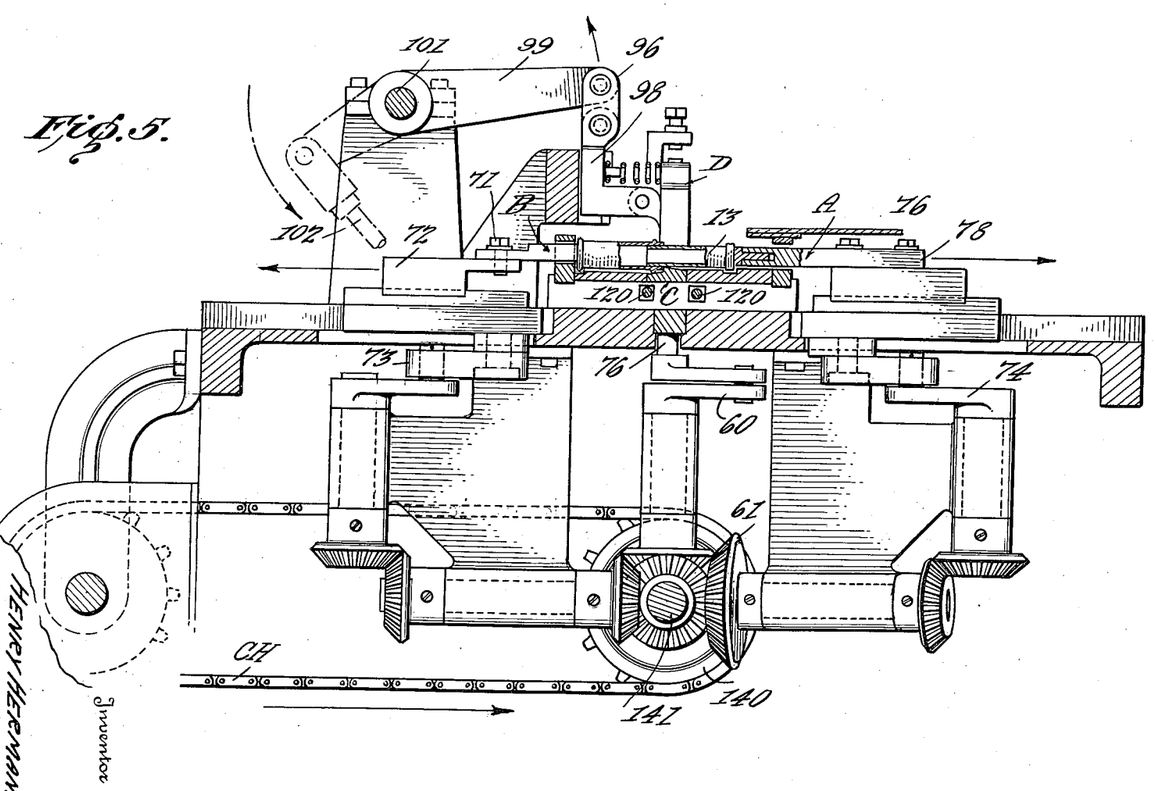
Fig. 5 is a view taken on the line 5—5 of Fig. 1.

Referring to Figs. 1, 2, and 5, the pusher B is shown above the bed of the machine and is secured by bolts 71 to a carrier 72 actuated by crank mechanism designated generally by the reference character 73, the crank mechanism being driven from the same source of power as the feeding mechanism as hereinafter explained. Similarly, crank mechanism designated generally by the reference character 74 is connected with a carrier 75 to which the pusher A is connected as by means of the bolts 76 in Fig. 1. The pusher A comprises (Figs. 1 and 5) the plate 78 which receives the bolts 76, the said plate being bifurcated at its forward end and having ears 79. A portion of the part 81 is housed between the bifurcated ends of the plate 78. The forward end of the part 81 is adapted to engage the hinged cover part of the can to push it toward the pusher B and the other can part moved thereby. The part 81 also has a rearwardly projecting extension 82 with a roller 83 mounted in its rear end. A pin 80 is mounted through ears 79 and the forward end of the extension 82 pivotally connecting the parts 81 and 78. An L-bracket 84 is secured to a fixed part or the frame of the machine in the path of movement of the roller 83 for contact therewith when the roller is brought to the projecting part of bracket 84 when pusher A moves in a plane intersecting the plane of the pusher B. Since the pusher A is adapted to engage with the canted can part I provide the inclined movement of the pusher relative to the pusher B along the same lines as the relative positions of the can parts, as clearly shown in Fig. 15, where the roller and plate 78 are shown moving in the direction toward the feeder B with the roller approaching the L-bracket 84, and the pusher B moving toward the pusher A to assemble the can parts. The part 81 is turned on its pivot when the roller contacts 84 to straighten the can part as hereinafter explained in detail.

The open ends of the can parts are guided together by the members C and D (Fig. 16) the member C comprising a plate having a slightly arcuate upper face 85 disposed on the side of and beneath the can part having the hinged lid moved by the pusher A, and having also a straight inclined face 86 on the side toward the pusher B, said latter face terminating at a shoulder 87 separating the faces 85 and 86. The part C, as shown clearly in Fig. 18, also has openings 88 at its ends to receive bolts to secure it to the bed plate of the machine in such a position that as the can parts are pushed together the part moved by the pusher B will move up the face 86 until the forward edge of the can abuts the shoulder 87, on C, and shoulder 87' on D, which also has a curved surface 87", as shown in Fig. 16, to abut the bead on the said can part. The can part moved by A passes up the arcuate face 85 and then into the open end of the other can part which is abutting the shoulders 87, 87', and face 87" and held against movement. The part moved by A of course initially moves at an angle to the part B as shown in Fig. 15, so that one corner of the part moved by A enters one corner of the part moved by B, which is the part resting against the shoulder 87. As the roller 83 meets the projecting end of the bracket 84 the part 81 is swung outwardly from the plate 78 and as the movement of the pusher A continues the part 81 is eventually swung on the pivot 80 until it is in alinement with the face of the pusher B so that the final movements of the pushers are in direct opposed lines. These final straight opposed movements, of course, occur after the one part has partially entered the other part. Thus the pusher A initially moves its can part at an angle to the pusher B then its line of force swings around while straightening out and is finally exerted in a line directly opposed to the line of force of the part B. This relative movement may be readily seen by reference to Figs. 15 and 1.

Figure 18:
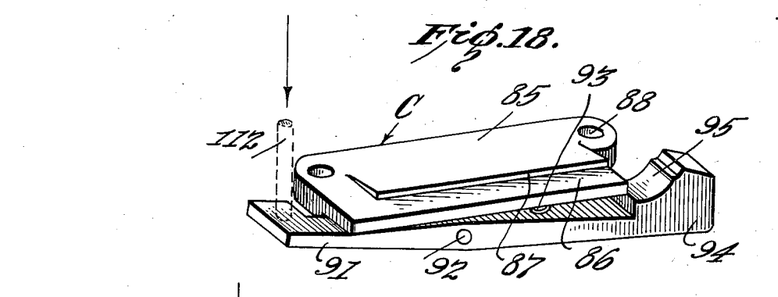
Fig. 18 is a perspective view of the can guiding means and one clamping element.
Figure 19:
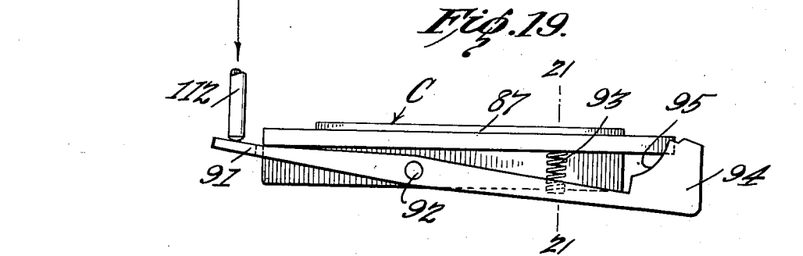
Fig. 19 is a side view of the elements shown in Fig. 18.
Figure 20:
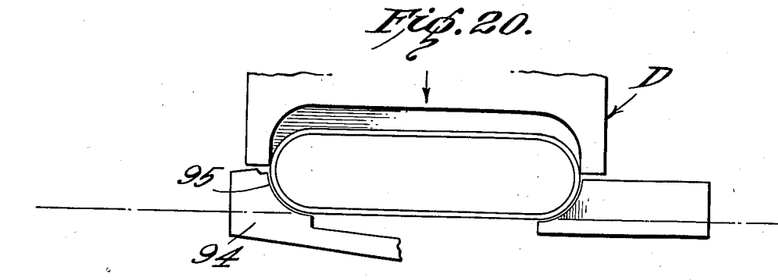
Fig. 20 is a fragmentary end elevation of the can clamping mechanism with a can shown therebetween.
Figure 21:
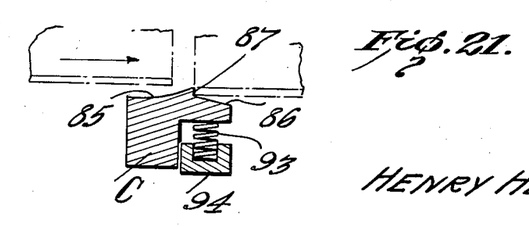
Fig. 21 is a view taken on the line 21—21 of Fig. 19.

During the final assembly of the can parts, they are held between or braced by the part D, which is shown in Figs. 7 and 20, and has a U-shaped mouth to fit around half of the can parts adjacent their open ends and a plate 91, shown clearly in Figs. 18 and 19, which is pivotally connected at 92 to the part C. A spring 93 is mounted between the plate C and plate 91, having its ends slightly embedded in the plate C and plate 91 to hold it in place, whereby it will normally tend to urge the end 94 provided with an arcuate notch 95 away from the part D. In order to bring the parts D and 91 together at the proper moment, I connect the yoke D to a plate 96, which is pivotally connected at 97 to a link 98, said link being shown as L-shaped and being connected at its upper end to the bell crank lever 99. Between the link 98 and the plate 96 there is mounted a coil spring 100 yieldably urging the plate 96 into substantial vertical position above the plate C. The bell crank lever is pivoted on the frame at 101 and at its rear end is connected by link 102 to member 103 (Figs. 3 and 6) which has a slot 104 in its lower end receiving the shaft 105 of the actuating mechanism hereinafter described. The member 103 also has rigidly connected therewith a pin 106 carrying a roller 107 which is disposed in the cam slot 108 of the cam wheel 109 driven by power mechanism hereinafter described. Obviously, as the cam wheel 109 rotates, the cam slot 108 engages with the roller 103 and reciprocates the rod 102 with the end containing the slot 104 moving across shaft 105 so as to oscillate the bell crank lever 99 and move the carrier 98, plate 96, and part D up and down.

As shown in Fig. 6, the yoke member D has rigidly connected thereto a plate 110 having at its upper end an offset boss 111 through which is mounted a rod 112, the rod being also mounted through an opening in the fixed part 113 on the frame of the machine and extending below said part to contact one end of the clamping member 91 as shown in Figs. 6, 7, 18 and 19. The rod 112 is keyed to the collar 114 by pin 115, and the coil spring 16 is mounted between the boss 111 and collar 114. Above the end of the rod 112, there is a bracket 117, through which is mounted a set screw 118 which serves as a stop for the rod 112, the screw being adjustable to locate its lower end at selected points. Obviously, when the yoke member D is reciprocated, the member 110 is moved therewith and the boss 111 moves up and down with the member 110, so that the spring 116 is compressed on the descending stroke of the yoke member D, whereby it forces the collar and the rod 112 into yieldable contact with the end of the clamping member 91 sufficiently to rock the same on its pivot 92 causing the end 94 to ascend, whereby the curved notch 95 will engage a portion of the side of the can parts as shown in Fig. 6, at the same time that the yoke member D is engaging portions of the upper surface and sides of the can parts, as clearly shown in Figs. 16 and 6. The yoke member D, member 91, and rod 112 are shown in elevated position in Fig. 7 with the end of the rod out of contact with the member 91, whereby the heavier end 94 gravitates downwardly moving from contact with and out of the path of the can part.

It will be seen from the foregoing that just at the time that the can parts are being forced into telescoping relation they are steadied or braced by engagement of the members D and 91 therewith at points adjacent the open ends of the can parts, the member D not only embracing portions of the sides of the can, but as shown in Fig. 16, also being disposed in front of the bead in the bottom half of the can at the side of the bead opposite to the direction of force exerted by the pusher B. The lower edge of the can is at the same time abutting the shoulder 87 on the member C, and the curved sides of the yoke member D and the notch 95 on the member 91 are embracing the sides of the can. Therefore, as the members A and B force the can parts into telescoping relation there can be no buckling, wobbling, or vertical movement of the can parts but only the opposed sliding movement which forces the parts telescopically together.

There remains, where desired, the matter of automatically discharging the interengaged or telescoped can parts from the machine. This may be effected by mechanism preferably associated with the feeding mechanism and operated thereby and shown best in Figs. 6, 7, 10-14.

Referring first to Figs. 10-14, it will be noticed that the cross or end bars 57 and 58 of the sliding frame 50 are provided with alined pairs of openings through which extend rods 120, each rod having at one end of the frame on the outer side of the bar 57, knobs 121, and at their other ends on the outer sides of the bar 58 elongated rectangular bars 122 which extend, as shown in Figs. 6 and 7, beneath a plate 123 which is urged, by a spring 124 clamped between the plate 123 and a washer 125 held on the bolt 126, toward the bed 127 of the frame. Thus, the plate 123 acts as a friction plate or retarding means to the movement of the rectangular members 122 and rods 120 in a manner and for a purpose presently described.

In Figs. 10-14, a pair of dogs 128 are shown journaled on pins 129 which extend into the longitudinal bars 59 of the frame 50 with their heads 130 located against the sides of the dogs, thus, pivotally connecting the dogs to the longitudinal side bars 59 of the frame 50. Rollers 131 are journaled to the lower ends of each of the dogs and are located in recesses 132 at each side of a cross-bar 133 extending between the dogs and through which the rods 120 extend intermediate the end bars 57 and 58. As should already be apparent from the description of the foregoing apparatus and location of the frame 50, the dogs 128 are disposed beneath the supports 20 on which the cans move, and as shown in Fig. 1, there are spaces 134 between the supports 20 into which the hooked ends of the dogs are adapted to extend above the supports 20 to engage one side of the assembled cans as shown in Fig. 7, so that when the mechanism carrying the dogs moves to the left of the position shown in Fig. 6, the dogs will engage the assembled can in the manner specified and move it to the position shown in Fig. 7 in the following manner.

When the frame 50 is in the position shown in Fig. 6 with the feeders 50 and 53 immediately behind the pair of can parts just delivered from the chute, the cross bar 133 is disposed beneath the can parts being assembled by the pushers A and B. As soon as the pushers have assembled the can parts the feeders and sliding frame 50 begin to move to the left of the position shown in Fig. 6, but due to the engagement of the friction plate 123 with the extensions 122 of the rods 120, the rods do not begin to move at the same moment that the sliding frame does, but are retarded in their movement, so that there is a pull exerted on the pivot 129 of the dogs 128 which throws the feed dogs into elevated position behind the assembled can so that the hooked ends will engage the can. Then the bar 133 and dogs 128 move with the frame 50 carrying the assembled can on to the receiving table 136 at the discharge end of the machine. It will be noted in Figs. 6, 7, and 10, that beneath the table 136, there is an abutment 137 for the knobs 121 on the rods 120. Now when the dogs 128 have moved with the frame to the position shown in Fig. 7, continued movement brings the knobs 121 into contact with the abutment 137, so that continued movement of the frame exerts a reverse pull on the dogs and retracts them to downward position in the slots 134 beneath the supports 20, whereby they may return to the position of Fig. 6 to carry off the next assembled can.

In Figs. 1, 4–6, the power mechanism for actuating the several parts above referred to is shown in detail. This comprises the power wheel P on the shaft S on which is located the clutch CL. The clutch may be actuated by crank lever CR connected to a rod extending under the chute to the hand lever HL. When the clutch is in and the power wheel is operating, the shaft S will obviously rotate the sprocket wheel SW over which is trained the chain CH, the chain also being trained over a second sprocket wheel 140, which sprocket wheel is keyed to shaft 141, which actuates the gears 61 operating the crank 60 and associated mechanism for operating the sliding frame previously described. The shaft 141 also operates the gears 142 and 143 which in turn actuate the shafts and cranks for the cranks 73 and 75 for the pushers B and A respectively. One of the gear wheels 143 also actuates the shaft 105 to which the cam wheel 109 is keyed. It will be understood from the foregoing and from the following description of the operation that the crank mechanism 60 and movements of the sliding frame also actuate the delivery chute dogs 25 and the discharge dogs 128, and that the movements of all of the parts in the actuating mechanism are synchronized or timed to effect operation at desired intervals and points, whereby the cans are continuously and evenly delivered, fed, assembled and discharged.

In operation, the cans are fed down the respective sides of the chute C with their open ends confronting the bar 11 and preferably with the top portions carrying the hinged covers on the lower side of the chute with reference to the position of Fig. 1 and the bottoms on the upper half of the chute, so that the pushers A will have fed to them the hinged cover portions. The lower dogs 25 in the chute will have a pair of can parts engaged in the position shown in Fig. 29, the upper dogs being retracted and the next pair of can parts resting against the lowermost pair which are held by the lower dogs. With the feeders 50 and 53 and the sliding frame retracted to the position shown in Fig. 6, and when the sliding frame and member 44 carried by the extension on the feeder 50 is moved forward, the pair of can parts which have been delivered on to the supports 20 in confronting relation, will be pushed to the left to the position shown in Fig. 7 in front of the pushers A and B and with the edges of the open ends confronting the guide C and with the larger or bottom portion confronting the shoulder 87 and the top or smaller portion which fits within the bottom confronting the arcuate face 85. Such movement of the sliding frame and the member 44 has caused the beveled face 45 to trip the crank lever 39 to retract the lower dogs 25 and dispose the upper dogs 25 outwardly to catch the second pair of can parts when the first pair were released by retraction of the lower dogs. This action of the dogs disposes the lower sides of the upper pair of cans shown in Fig. 29 beyond the position of the lower dogs, so that when the feeding mechanism moves the member 44 to the position shown in Fig. 7, the released pair of can parts are on top of the extension 46 and the roller 41 is on top of the member 44. Obviously, when the feeding mechanism assumes the position of Fig. 6, the lowermost can parts which have been released will drop on to the support 20 in front of the feeders, and the roller 41 will ride down the beveled face 45 so that the upper feed dogs are retracted to release the can parts held thereby, and at the same time the lower feed dogs are exposed to catch said pair of can parts. Thus, the column of cans coming down the chute is continuously moving and being supported first by the can parts held by the upper dogs and then by the can parts held by the lower dogs. Similarly, can parts delivered on to the support 20 are moved by the feeders in front of the pushers A and B and as these pushers engage the cans, they are in the position shown in Fig. 15 with the pusher A at the same angle of inclination relative to the pusher B as the hinged cover can part is relative to the bottom. The pusher B as its lugs 70 seated in the recess in the bottom of the bottom can part and moves the can part until the lower edge of the open end contacts the shoulder 87. Simultaneously the pusher A has been moving the other part of the can in said inclined or canted position along the arcuate face 85 of the part C and the yoke member D has been descending with the rod 112, the latter causing the member 91 to swing on its pivot 92 to raise the end 94 toward the yoke member D. After the corner of the canted can part has entered the other can part, the roller 83 carried by the pusher A contacts the bracket 84 and gradually causes the part 81 of the pusher A to swing on the pivot 80, turning the can part moved thereby as it is urged into the other can part and eventually when the part 81 has straightened or just about straightened, the cans are firmly but yieldably braced by the yoke member D and member 91, so that they may be further moved by the pushers into the complete assembled position shown in Fig. 16 with the bead of one can part seated in the bead of the other can part. At the instant of the completion of the assembly just described, the parts D and 91 begin to move from each other and the dogs 128 begin to turn on the pivots 129 to place the hooked ends behind the assembled can, then as the feeding mechanism moves to bring the next can parts forward for assembly the assembled can is carried to the table 136, and at the same time the dogs 25 in the delivery chute are releasing the lowermost pair of can parts and catching the pair next above. This operation is carried on continuously and it should be obvious that with the foregoing mechanism, I not only greatly simplify and reduce the cost of assembling the can parts, due to the fact that the machine can operate at a relatively high rate of speed, assembling as many as 80 a minute, but I also avoid the injuries and other complications hereinbefore referred to in connection with the old hand assembling method.

There is another detail remaining to be mentioned, but it forms no part of the invention. However, being illustrated, I would point out that in Fig. 6 I have shown a hand wheel HW keyed to a shaft connected with the gears 61. The provision of this hand wheel is made so that in case something goes wrong with the apparatus, the clutch may be thrown out and the hand wheel turned to easily establish the parts in desired position for repair or correction of the defect. In this connection the provision of the hinged plate 15 permits access to the end of the feed chute. There is also provided above the feed table 136 (see Fig. 1) a hinged plate 150 which is normally urged lightly but firmly by the spring 151 down against the cans being discharged. This may also be swung up on its hinge to give access to the slot 134.

I claim:

1. A machine for telescopingly assembling the parts of two part tubular receptacles, including a support for the parts to be assembled, means adjacent one end of the support to deliver companion parts thereto, means for advancing companion receptacle parts in endwise relation along said support in substantial alinement with each other and for arranging one of the parts at an angle to the other, means adjacent the other end of the support for moving the angularly disposed part into telescoping relation with the other part and simultaneously straightening and aligning the parts during the assembling operation, and means for guiding one part into the other.

2. A machine for telescopingly assembling the parts of two part tubular receptacles, including a support for the parts to be assembled, means for advancing companion receptacle parts in endwise relation along said support and for arranging one of the parts at an angle to the other, means for moving the angularly disposed part into telescoping relation with the other part and simultaneously straightening and aligning the parts during the assembling operation, and means operable by said first means for successively delivering pairs of said parts to said first means to be advanced thereby.

3. A machine for telescopingly assembling the parts of two part tubular receptacles, including a support for the parts to be assembled, means for advancing companion receptacle parts in endwise relation along said support and for arranging one of the parts at an angle to the other, means for moving the angularly disposed part into telescoping relation with the other part and simultaneously straightening and aligning the parts during the assembling operation, and means operable by said first means for discharging the assembled can parts.

4. A machine for telescopingly assembling the parts of two part tubular receptacles, including a support for the parts to be assembled, means for advancing companion receptacle parts in endwise relation along said support and for arranging one of the parts at an angle to the other, means for moving the angularly disposed part into telescoping relation with the other part and simultaneously straightening and aligning the parts during the assembling operation, means operable by said first means for successively delivering pairs of can parts to said first means to be advanced thereby, and means also operable by said first means for discharging the assembled can parts.

5. A machine for assembling telescopingly fitting parts of a receptacle comprising a support to receive the parts, a pair of feeders to advance the parts on said support and to position them with their open ends confronting and arranged at an angle to each other, a pair of pushers engageable with the parts and operable transversely of the path of movement of the feeders, means for causing one of said pushers to change its direction of force after the angularly arranged open ends of the parts are partially assembled to straighten said parts relative to each other during final assembly of the parts, and means embracing the open end of the larger part during operation of said pushers to brace the said part during assembly.

6. In apparatus for assembling tubular parts of receptacles to be telescopically assembled, means for delivering successively thereto pairs of such parts comprising, a receiving support, means for continuously feeding the parts in spaced relation with open ends confronting toward said support, means adjacent said support and the discharge end of said second means for engaging the alined parts nearest said support and while so engaged preventing movement of the succeeding parts, means in advance of said third means engageable with the next succeeding alined parts at a predetermined time to also prevent movement of the succeeding parts and to position the parts engaged thereby for engagement by said third means, and means for alternately engaging and disengaging said third and fourth means with successive parts.

7. In apparatus for assembling tubular parts of receptacles to be telescopically assembled, means for delivering successively thereto pairs of such parts comprising, a receiving support, means for continuously feeding the parts in spaced relation with open ends confronting toward said support, means adjacent said support and the discharge end of said second means for engaging the alined parts nearest said support and while so engaged preventing movement of the succeeding parts, means in advance of said third means engageable with the next succeeding alined parts at a predetermined time to also prevent movement of the succeeding parts and to position the parts engaged thereby for engagement by said third means, means for alternately engaging and disengaging said third and fourth means with successive parts, and means for moving the delivered parts along said support.

8. In apparatus for assembling tubular parts of receptacles to be telescopically assembled, means for delivering successively thereto pairs of such parts comprising, a chute down which the parts may be fed in columns with mating parts arranged in spaced alined relation and with open ends confronting, upper and lower retaining elements adjacent the discharge end of the chute and between the said open ends of the parts, means on each of said elements movable into the open ends of alined parts for engagement with inner surfaces thereof, and means for alternately moving said upper and lower elements respectively into and out of said open ends to alternately engage said second means with the said surfaces of successive parts, said elements and second means being so arranged relative to each other and the parts that when the means on the upper elements are engaging alined parts said parts are positioned for engagement by the means on the lower elements to support all parts thereabove in the chute.

9. In a machine for telescopically assembling two part tubular receptacles comprising a reciprocating member, means on said member for delivering the parts into substantially alined relation on a support with their open ends confronting, means for inserting one part within the open end of the other, means for discharging the assembled receptacle from the support, said last means including at least one pivoted dog, a mounting therefor carried by said reciprocating member and movable relative thereto, said dog being pivoted to a part of said member, and means for retarding movement of said mounting relative to movement of said member whereby said dog is turned on its pivot and is raised and lowered relative to said support before moving with said member.

10. In apparatus for telescopically assembling the companion parts of two part receptacles wherein each has an open end or mouth one fitting within the other, one of the parts having a cover and the other a sealed bottom, a support on which the companion parts are arranged with open mouths confronting each other, a pair of feeders to move the parts across said support, one of the feeders having a beveled face to engage the side of one of the parts and arrange it at an angle to the other, a pair of pushers movable transversely to the path of movement of the feeders one to engage the angularly disposed part and one to engage the straight part and move the smaller open mouth of one part within the mouth of the larger part, and means for changing the direction of motion of one of said pushers relative to the other to straighten the parts during final insertion or assembly.

11. In apparatus for telescopically assembling the companion parts of two part receptacles wherein each has an open end or mouth one fitting within the other, one of the parts having a cover and the other a sealed bottom, a support on which the companion parts are arranged with open mouths confronting each other, a pair of feeders to move the parts across said support, one of the feeders having a beveled face to engage the side of one of the parts and arrange it at an angle to the other, a pair of pushers movable transversely to the path of movement of the feeders one to engage the angularly disposed part and one to engage the straight part and move the smaller open mouth of one part within the mouth of the larger part, means for changing the direction of motion of one of said pushers relative to the other to straighten the parts during final insertion or assembly, and means operable by movement of the feeders for removing the assembled parts from the support.

12. In apparatus for telescopically assembling the companion parts of two part receptacles wherein each has an open end or mouth one fitting within the other, one of the parts having a cover and the other a sealed bottom, a support on which the companion parts are arranged with open mouths confronting each other, a pair of feeders to move the parts across said support, one of the feeders having a beveled face to engage the side of one of the parts and arrange it at an angle to the other, a pair of pushers movable transversely to the path of movement of the feeders one to engage the angularly disposed part and one to engage the straight part and move the smaller open mouth of one part within the mouth of the larger part, means for changing the direction of motion of one of said pushers relative to the other to straighten the parts during final insertion or assembly, and means embracing the mouth of the larger part during insertion of the smaller part preventing lateral movement of the larger part during the assembling.

13. In apparatus for telescopically assembling the companion parts of two part receptacles wherein each has an open end or mouth one fitting within the other, one of the parts having a cover and the other a sealed bottom, a support on which the companion parts are arranged with open mouths confronting each other, a pair of feeders to move the parts across said support, one of the feeders having a beveled face to engage the side of one of the parts and arrange it at an angle to the other, a pair of pushers movable transversely to the path of movement of the feeders one to engage the angularly disposed part and one to engage the straight part and move the smaller open mouth of one part within the mouth of the larger part, means for changing the direction of motion of one of said pushers relative to the other to straighten the parts during final insertion or assembly, and means embracing the mouth of the larger part during insertion of the smaller part preventing lateral movement of the larger part during the assembling, said last means also guiding the mouth of said smaller part into the mouth of the larger part as the pushers bring the parts into approaching relation.

14. In apparatus for assembling the companion parts of two part receptacles, each part having an open end or mouth one of which fits within the other, a support for the parts, a chute down which the companion parts are fed in pairs with their open ends confronting, feeder means to move the delivered parts along the support with their said mouths confronting, means operable by said feeder means for delivering pairs of the companion parts on to the support, means for inserting the smaller mouth of one part within the larger mouth of the other part, and means operable by said feeder means for removing the assembled parts from said support.

15. A machine for assembling companion parts of a telescoping box, one of which parts has a bottom and the other a cover, said machine comprising means for supporting a pair of box parts in end to end relation with corresponding side walls in the same plane and their open ends confronting, means for advancing the said pair of parts sidewise over said supporting means with one part positioned at an angle to the other, means for maintaining said other part at substantially right angles to the path of movement of the parts, and means for causing a relative approaching movement between the parts transverse to their advancing path to cause an edge of the angularly-positioned part to enter the confronting open end of its companion part, said means operating to straighten the angularly-positioned part as it approaches its companion and until the two parts are gradually alined with their walls in parallel telescoping relation one with the other.

16. A machine for assembling companion parts of a telescoping box, one of which parts has a bottom and the other a cover, said machine comprising means for supporting a pair of box parts in end to end relation with corresponding side walls in the same plane and their open ends confronting, means for advancing the said pair of parts sidewise over said supporting means with one part positioned at an angle to the other, means for maintaining said other part at substantially right angles to the path of movement of the parts, means for causing a relative approaching movement between the parts transverse to their advancing path to cause an edge of the angularly-positioned part to enter the confronting open end of its companion part, said means operating to straighten the angularly-positioned part as it approaches its companion and until the two parts are gradually alined with their walls in parallel telescoping relation one with the other, and relatively movable companion means intermediate said advancing means for guiding the edge of one box part into telescoping relation with the other box part.

17. A machine for assembling companion parts of a telescoping box, one of which parts has a bottom and the other a cover, said machine comprising means for supporting a pair of box parts in end to end relation with corresponding side walls in the same plane and their open ends confronting, means for advancing the said pair of parts sidewise over said supporting means with one part positioned at an angle to the other, means for maintaining said other part at substantially right angles to the path of movement of the parts, means for causing a relative approaching movement between the parts transverse to their advancing path to cause an edge of the angularly-positioned part to enter the confronting open end of its companion part, said means operating to straighten the angularly-positioned part as it approaches its companion and until the two parts are gradually alined with their walls in parallel telescoping relation one with the other, and opposed relatively movable means intermediate said advancing means acting upon opposite faces of the box parts for guiding the confronting ends thereof into telescoping relation.

18. In a machine of the class described, a horizontal support for a pair of companion parts to be telescopingly assembled, means for advancing a pair of said parts sidewise over said support with their open ends confronting and with one part positioned at an angle to the other, assembling means comprising a pair of opposed pushers movable transversely to the path of movement of said parts over said support, and a pair of opposed relatively movable guiding and positioning means operable to embrace said parts at the point where they are to be telescopingly assembled, and means for moving one of said relatively movable parts toward and from the other.

19. In a machine of the class described, a horizontal platform and means for positioning a pair of companion parts to be assembled upon said platform with their open ends confronting and one part positioned at an angle to the other, means for telescopingly assembling said parts comprising a pusher positioned to engage the outer end of each part for moving the parts endwise into telescopic relation, and guiding means located at the confronting ends of said parts, comprising a fixed part and a vertically-reciprocating part movable toward and from the fixed part, said fixed and reciprocating parts having opposed faces conforming to the outer contour of the box parts to be assembled.

20. The construction and arrangement of parts defined in claim 19 and wherein the said fixed and reciprocating parts each has a longitudinally-extending shoulder which form abutments to limit endwise movement of one of the box parts during the assembling operation.

21. The construction and arrangement of parts defined in claim 18, and wherein one of the said guiding and positioning means includes a movable part actuated by the opposed relatively movable guiding and positioning means for embracing a side wall of the box parts during the assembling operation.

22. In a machine for telescopingly assembling the parts of a two-part receptacle, a horizontal support to receive the parts in end-to-end relation with their open ends confronting, a pair of reciprocating feeders to move the parts sidewise along said support, each of said feeders having a surface to engage the side of the respective parts and one of said surfaces being so constructed and arranged relative to the other as to incline one part relative to the other, and means independent of said feeders engageable with the outer ends of the so-positioned parts and operable to guide the open end of one part within the other part and for straightening the said inclined part.

23. The method of telescopingly assembling the parts of two-part tubular receptacles, which consists in supporting a plurality of companion parts in end-to-end relationship with their longitudinal axes in the same plane and in parallel rows, successively advancing such companion parts in pairs sidewise along a common horizontal path with their open ends confronting and shifting one of the parts to position it at an angle to the other with their longitudinal axes in intersecting planes, then moving the angularly-disposed part endwise to bring an edge portion thereof into the confronting open end of its companion part and simultaneously swinging the angularly-disposed part while maintaining its companion part and its longitudinal axis in a plane parallel to its original position to bring portions of the walls of the two parts into parallelism and to restore their longitudinal axes in a common plane to effect telescoping relation one with the other.

24. In apparatus for assembling tubular parts of receptacles to be telescopically assembled, mechanism for delivering successively thereto pairs of such parts comprising, a support onto which the parts are delivered, a chute down which the parts are fed toward the support with open ends of the respective pairs of parts confronting each other, means adjacent the lower end of the chute movable into the open ends of the pair of parts nearest the support to prevent feeding movement of the succeeding pairs of parts and movable out of said open ends to permit said parts nearest the support to move thereon, means adjacent said first means and in advance thereof movable into the open ends of the next succeeding pair of parts when said first means moves out of the open ends of the lowermost pair to hold said succeeding pair of parts against delivery to the support while positioning same for insertion therein of said first means after the lowermost pair have been delivered onto the support, and means for withdrawing said second means from the open ends of said succeeding parts when said first means moves therein.

HENRY HERMANI.